(12) United States Patent
Gotou et al.

(10) Patent No.: US 8,362,166 B2
(45) Date of Patent: Jan. 29, 2013

(54) PROCESS FOR THE PRODUCTION OF POLYMER MICROPARTICLES

(75) Inventors: Akihiro Gotou, Nagoya (JP); Hideo Matsuzaki, Nagoya (JP); Shinji Hibino, Nagoya (JP)

(73) Assignee: Taogosei Co., Ltd., Tokyo (JP)

( * ) Notice: Subject to any disclaimer, the term of this patent is extended or adjusted under 35 U.S.C. 154(b) by 115 days.

(21) Appl. No.: 12/865,028

(22) PCT Filed: Jan. 20, 2009

(86) PCT No.: PCT/JP2009/050758
§ 371 (c)(1),
(2), (4) Date: Oct. 27, 2010

(87) PCT Pub. No.: WO2009/096266
PCT Pub. Date: Aug. 6, 2009

(65) Prior Publication Data
US 2011/0040060 A1    Feb. 17, 2011

(30) Foreign Application Priority Data
Feb. 1, 2008   (JP) ................................. 2008-022278

(51) Int. Cl.
*C08F 2/14*    (2006.01)
(52) U.S. Cl. .................. 526/230; 526/227; 526/235
(58) Field of Classification Search .................. 526/223, 526/227, 229, 230, 234
See application file for complete search history.

(56) References Cited

U.S. PATENT DOCUMENTS

| | | | |
|---|---|---|---|
| 37,021 A | 11/1862 | Williston | |
| 5,216,070 A * | 6/1993 | Plochocka et al. ............ | 524/801 |
| 5,624,967 A | 4/1997 | Hitomi et al. | |
| 5,744,564 A * | 4/1998 | Stanley et al. ............. | 526/317.1 |
| 6,323,250 B1 | 11/2001 | Kadonaga et al. | |
| 2006/0229369 A1 | 10/2006 | Frank et al. | |
| 2010/0069592 A1* | 3/2010 | Matzuaki et al. ............. | 526/287 |
| 2011/0021712 A1* | 1/2011 | Gotou et al. .................. | 525/319 |

FOREIGN PATENT DOCUMENTS

| | | |
|---|---|---|
| JP | 05 222107 | 8/1993 |
| JP | 6 506252 | 7/1994 |
| JP | 8 188602 | 7/1996 |
| JP | 2003 34725 | 2/2003 |
| JP | 2003 516429 | 5/2003 |

(Continued)

OTHER PUBLICATIONS

International Search Report issued Apr. 21, 2009 in PCT/JP09/050758 filed Jan. 20, 2009.
U.S. Appl. No. 12/811,385, filed Jul. 1, 2010, Gotou, et al.
U.S. Appl. No. 12/811,658, filed Jul. 2, 2010, Gotou, et al. U.S. Appl. No. 12/811,948, filed Jul. 7, 2010, Hibino, et al.

(Continued)

*Primary Examiner* — Vu A Nguyen
(74) *Attorney, Agent, or Firm* — Oblon, Spivak, McClelland, Maier & Neustadt, L.L.P.

(57) ABSTRACT

The object of the present invention is to provide a process for producing high-quality polymer microparticles having uniform particle size of the order of several micrometers to tens of micrometers by inverse suspension polymerization at high productivity while keeping excellent dispersion stability without causing aggregation among particles. The process is one for the production of polymer microparticles by inverse polymerization of a vinyl monomer and is characterized in that an oil-soluble oxidizing agent and a water-soluble reducing agent are used as a polymerization initiator and the oil-soluble oxidizing agent is fed after the water-soluble reducing agent is fed.

7 Claims, 3 Drawing Sheets

FOREIGN PATENT DOCUMENTS

| | | |
|---|---|---|
| JP | 2003 301019 | 10/2003 |
| JP | 2004 262747 | 9/2004 |
| WO | WO 01/36492 A1 | 5/2001 |
| WO | WO 2005/021598 A1 | 3/2005 |

OTHER PUBLICATIONS

Extended European Search Report issued Sep. 26, 2011, in Patent Application No. 09705112.2.

* cited by examiner

PROCESS FOR THE PRODUCTION OF POLYMER MICROPARTICLES

FIELD OF THE INVENTION

The present invention relates to a method for producing polymer microparticles. More specifically, the present invention relates to a method for producing high-quality polymer microparticles uniform in particle size having a specific range of particle size by inverse suspension polymerization of a vinyl-based monomer at high productivity, without causing aggregation of particles and in a stable even if the scale is increased.

BACKGROUND ART

Micron-sized spherical polymer microparticles are utilized for cosmetic additives, supports for various chemical materials, spacers, column packings for chromatography, light diffusion agents, porosification agents, weight-lightening agents, antiblocking agents, surface modification agents for recording paper, and the like.

Among these, hydrophilic crosslinked polymer microparticles can be used as hydrous gel microparticles, and are useful as cosmetics additives, supports, porosification agents, weight-lightening agents, and surface modification agents for recording paper.

Production of polymer particles by inverse suspension polymerization of a vinyl-based monomer has conventionally been carried out. As technologies of producing hydrophilic crosslinked polymer particles by inverse suspension polymerization, there have been known a method in which a water-in-oil microdispersed droplet of a monomer is formed using a compound having a specific HLB as a dispersing agent before polymerization and then the monomer is polymerized while dropping it (see Patent Document 1), a method in which inverse suspension polymerization is carried out in the presence of water-absorptive polymer particles, an oil-soluble polymerization initiator and a dispersing agent, and during or after the polymerization a hydrophobic vinyl-based monomer and an oil-soluble polymerization initiator are added to perform polymerization (see Patent Document 2), a method in which a hydrophilic vinyl-based monomer is an inverse suspension polymerized in the presence of a silicone compound having at least one functional group in the reaction system (see Patent Document 3), and the like.

In these conventional technologies, there are problems that the dispersion stability of polymer particles during or after polymerization is not sufficient, the particle size of polymer particles obtained is nonuniform, and the hydrophilicity of polymer particles obtained is degraded. In particular, when hydrophilic particles with a high degree of crosslinking are produced while increasing the proportion of a multifunctional vinyl-based monomer used, polymerization stability is significantly degraded, and problems such as aggregation of particles, degradation in the quality of polymer particles obtained, and a reduction in productivity easily occur.

Since all the above-mentioned production methods are ones in which polymerization is performed by feeding a monomer emulsion continuously over one hour or more to a reactor heated to a high temperature of 70° C. or higher, aggregation of particles or the like easily occurs and the particle size of the resulting polymer particles becomes irregular. In addition, when a large amount of a crosslinking agent such as a multifunctional vinyl-based monomer, is used, most part of unreacted crosslinking agent becomes easy to flow out into a continuous phase side, and when polymerization is continued in this state, particles aggregate more and this is expected to lead to the aforementioned deterioration in quality of polymer particles.

Furthermore, Patent Document 4 discloses an absorptive polymer particle which is produced by inverse suspension polymerization using a redox polymerization initiator for the production of a water absorptive polymer having a specific water absorptivity, and a polymer particle is produced by feeding tert-butyl hydroxyperoxide which is an oil-soluble oxidizing agent, and then feeding sodium bisulfite which is a water-soluble reducing agent.

According to this production method, particle size control of microparticles can be performed more precisely in comparison to aforementioned conventional technologies. Since a polymerization reaction occurs before the water-soluble reducing agent is diffused sufficiently, this is not satisfactory as a method for producing high-quality particles that are uniform in particle size and have a particle size falling within a specified range, in a stable state without causing, for example, aggregation of particles.

Patent Document 1: JP-A H05-222107
Patent Document 2: JP-A 2003-301019
Patent Document 3: JP-A 2003-34725
Patent Document 4: JP-A 2004-262747

DISCLOSURE OF THE INVENTION

Problems that the Invention is to Solve

The object of the present invention is to provide a method for the production of high-quality polymer microparticles uniform in particle size having a particle size of the order of several micrometers to tens of micrometers at high productivity while keeping excellent dispersion stability without causing aggregation of particles by inverse suspension polymerization.

In particular, the object of the present invention is to provide an inverse suspension polymerization method in which high-quality polymer microparticles uniform in particle size can be smoothly produced at high productivity while keeping high polymerization stability and suspension stability even if hydrophilic particles having a high degree of crosslinking are produced.

Means for Solving the Problems

The present inventors have engaged in an intensive investigation in order to attain the above objects. The inventors thought that it is important to perform the polymerization at a lower temperature for a shorter time in comparison to the conventional technologies for the production of polymer microparticles by subjecting a vinyl-based monomer to inverse suspension polymerization, and studied the conditions. As a result, when an oil-soluble oxidizing agent and a water-soluble reducing agent are used as a polymerization initiator, and inverse suspension polymerization in which the water-soluble reducing agent is fed and then the oil-soluble oxidizing agent is fed is carried out, it is found that high-quality spherical particles having a particle size of the order of several micrometers to tens of micrometers and being uniform in particle size can be produced while keeping excellent dispersion stability and polymerization stability without causing aggregation, clumping, and adhesion to a polymerization apparatus of polymer particles during or after polymerization.

The present invention for solving the above-mentioned problems is as follows.

The first invention is a method for producing polymer microparticles by inverse suspension polymerization of a vinyl-based monomer, and is characterized in that an oil-soluble oxidizing agent and a water-soluble reducing agent are used as a polymerization initiator, and that the oil-soluble oxidizing agent is fed after the water-soluble reducing agent is fed.

The second invention is a method for producing polymer microparticles according to the first invention, wherein the oil-soluble oxidizing agent is fed over a time range from 20 seconds to 120 seconds.

The third invention is a method for producing polymer microparticles according to the first or second inventions, wherein the oil-soluble oxidizing agent is fed to a reactor through a feed port located below the reaction liquid level.

The fourth invention is a method for producing polymer microparticles according to any one of the first to third inventions, wherein a macromonomer having a radically polymerizable unsaturated group at an end of a polymer derived from a vinyl-based monomer is used as a dispersion stabilizer.

The fifth invention is a method for producing polymer microparticles according to any one of the first to fourth inventions, wherein the polymer microparticles produced by inverse suspension polymerization are having a crosslink density of 0.5% or more by mol.

The sixth invention is a method for producing polymer microparticles according to any one of the first to fifth inventions, wherein the polymer microparticles produced by inverse suspension polymerization are polymer microparticles which have an average particle size in a saturated water-swollen state of 2 to 100 μm, and a content ratio of particles having a particle size of 150 μm or larger in a saturated water-swollen state of 1.0% or less by weight.

The seventh invention is a method for producing polymer microparticles according to any one of the first to fifth inventions, wherein the polymer microparticles produced by inverse suspension polymerization are polymer microparticles which have a water absorption ratio of 5 to 50 times, an average particle size in a saturated water-swollen state of 5 to 70 μm, and a content ratio of particles having a particle size of 150 μm or larger in a saturated water-swollen state of 0.3% or less by weight.

Effect of the Invention

According to the production method of the present invention, high-quality spherical hydrophilic polymer microparticles remarkably higher uniform in particle size than those by conventional technologies can be produced at high productivity while keeping high dispersion stability and polymerization stability without causing aggregation, clumping and adhesion to a polymerization apparatus of particles during or after polymerization. Moreover, according to the production method of the present invention, even if hydrophilic particles having a high degree of crosslinking are produced using a large amount of a multifunctional vinyl-based monomer, high-quality hydrophilic crosslinked polymer microparticles uniform in particle size can be produced at high productivity without causing aggregation, clumping and adhesion to a polymerization apparatus of particles.

Furthermore, when the production is carried out under conditions of an increased scale for increasing the productivity, the production method of the present invention can lead to high-quality polymer microparticles.

EXPLANATION OF THE REFERENCE NUMBERS

Figure 1:
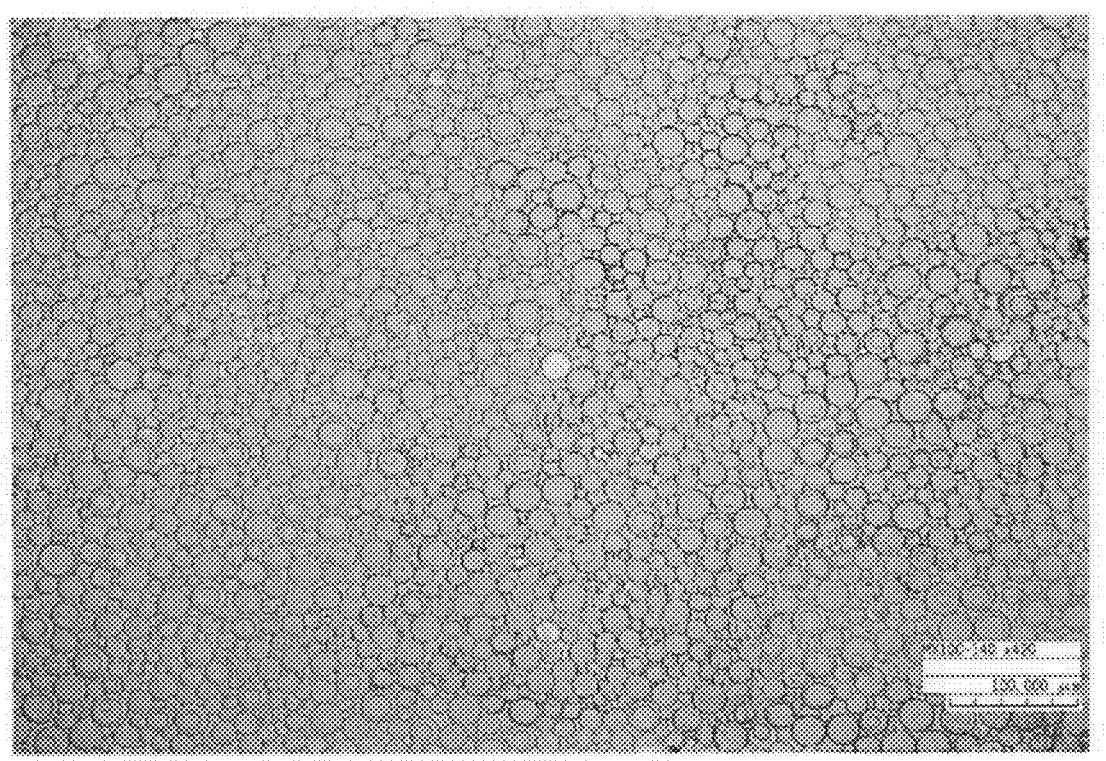
FIG. 1 is a microscope photograph of polymer microparticles T-1 (after polymerization, in-oil dispersion)

1: burette, 2: pinch cock, 3: silicone tube, 4: polytetrafluoroethylene tube, 5: funnel, 6: sample (polymer microparticles), 7: filter paper for fixing sample (polymer microparticles), 8: supporting cylinder, 9: adhesive tape, 10: filter paper for device, 11: lid, 12: ion exchange water

BEST MODE FOR CARRYING OUT THE INVENTION

Hereinafter, the embodiments of the present invention are described in detail.

The "inverse suspension polymerization of a vinyl-based monomer" according to the present invention means a polymerization using an oil phase as a dispersion medium and an aqueous phase as a dispersoid. In general, in the case where polymerization is performed using a hydrophilic vinyl-based monomer, particles are produced by w/o type inverse suspension polymerization in which an aqueous phase (an aqueous solution of the hydrophilic vinyl-based monomer) is suspended in the form of droplets in an oil phase (a dispersion medium composed of a hydrophobic organic solvent).

The inverse suspension polymerization of a vinyl-based monomer according to the present invention is one in which the vinyl-based monomer is subjected to inverse suspension polymerization using an oil-soluble oxidizing agent and a water-soluble reducing agent as a polymerization initiator in the presence of a dispersion stabilizer.

The preferable method in the present invention is one which comprises charging a monomer mixture prepared in advance by stirring and uniformly dissolving a vinyl-based monomer (and its neutralized product) and water to a reaction liquid in which an oil Phase prepared using a dispersion stabilizer and a hydrophobic organic solvent has been charged, then feeding a water-soluble reducing agent, and subsequently feeding an oil-soluble oxidizing agent to initialize the polymerization.

The vinyl-based monomer for the inverse suspension polymerization according to the present invention is not particularly limited so long as it is a radically polymerizable vinyl-based monomer. For example, a hydrophilic monomer having a hydrophilic group such as a carboxyl group, an amino group, a phosphoric acid group, a sulfonic acid group, an amide group, a hydroxyl group, a quaternary ammonium group or the like can be used. Among these, when a monomer having a carboxyl group, a sulfonic group or an amide group is used, polymer microparticles high in hydrophilicity and excellent in water absorption capacity and water-retaining property can be obtained, being preferable.

Specific examples of the hydrophilic vinyl-based monomer include a vinyl-based monomer having a carboxyl group or its (partially) alkali-neutralized product, such as (meth)acrylic acid, crotonic acid, itaconic acid, maleic acid, fumaric acid, monobutyl itaconate, monobutyl maleate and cyclohexanedicarboxylic acid; a vinyl-based monomer having an amino group or its (partially) acid-neutralized product or its (partially) quaternary product, such as N,N-dimethylaminoethyl(meth)acrylate, N,N-diethylaminoethyl(meth)acrylate, N,N-dimethylaminopropyl(meth)acrylate, and N,N-dimethylaminopropyl(meth)acrylamide; N-vinylpyrrolidone, acryloylmorpholine; a vinyl-based monomer having a phosphoric acid group, or its (partially) acid-neutralized product, such as acid phosphoxyethyl methacrylate, acid phosphoxypropyl methacrylate, and 3-chloro-2-acid phosphoxypropyl methacrylate; a vinyl-based monomer having a sulfonic acid group or phosphonic acid group, or its (partially) alkali-neutralized product, such as 2-(meth)acrylamide-2-methylpropanesulfonic acid, 2-sulfoethyl(meth)acrylate, 2-(meth)acryloylethanesulfonic acid, allylsulfonic acid, styrene sulfonic acid, vinylsulfonic acid, allylphosphonic acid, and vinylphosphonic acid; a nonionic hydrophilic monomer such as (meth)acrylamide, N,N-dimethyl acrylamide, N-isopropyl acrylamide, N-methylol(meth)acrylamide, N-alkoxymethyl (meth)acrylamide, (meth)acrylonitrile, hydroxyethyl(meth) acrylate, hydroxypropyl(meth)acrylate and the like. These compounds may be used singly or in combination of two or more types thereof.

Using a compound selected from (meth)acrylic acid, (meth)acrylamide and 2-acrylamide-2-methylpropanesulfonic acid singly or in combination of two or more types for the inverse suspension polymerization is preferable from the viewpoint that polymerizability is excellent and resulting particles are excellent in water absorption property. The particularly preferred is (meth)acrylic acid.

In the present invention, a multifunctional vinyl-based monomer having two or more radically polymerizable unsaturated groups may be used as a vinyl-based monomer together with at least one of the above-mentioned monofunctional hydrophilic vinyl-based monomer for the inverse suspension polymerization.

Therefore, the "vinyl-based monomer" according to the present invention is a general term for the monofunctional vinyl-based monomer and the multifunctional vinyl-based monomer.

The multifunctional vinyl-based monomer is not particularly limited so long as it has two or more groups radically polymerizable with the above-mentioned hydrophilic vinyl-based monomer, and specific example thereof includes a di- or tri-(meth)acrylate of a polyol, such as polyethylene glycol di(meth)acrylate, polypropylene glycol di(meth)acrylate, glycerin tri(meth)acrylate, trimethylolpropane tri(meth)acrylate, and a tri(meth)acrylate of a modified trimethylolpropane ethylene oxide; a bisamide such as methylenebis(meth)acrylamide; divinyl benzene, allyl(meth)acrylate, and the like. These compounds may be used singly or in combination of two or more types thereof.

Among these, polyethylene glycol diacrylate and methylene bis(meth)acrylamide are suitably used as the multifunctional vinyl-based monomer because it excels in solubility in a mixed liquid of water and a base-forming hydrophilic vinyl-based monomer and it is advantageous in being used in an amount increased for obtaining a high degree of crosslinking. The particular preferred is polyethylene glycol di(meth)acrylate.

The amount of the multifunctional vinyl-based monomer to be used depends on the type of the vinyl-based monomer to be used and the intended application of resulting particles. When the polymer particles are required to have crosslinked characteristics, the amount thereof is preferably in the range from 0.1 to 100 mol, more preferably from 0.2 to 50 mol, and further preferably from 0.5 to 10 mol based on 100 mol of the total amount of the monofunctional vinyl-based monomer to be used.

Examples of the hydrophobic organic solvent that forms an oil phase (dispersion medium) in the inverse suspension polymerization according to the present invention include an aliphatic hydrocarbon solvent having 6 or more carbon atoms; an aromatic hydrocarbon solvent such as benzene toluene, xylene and ethyl benzene; a silicone-based solvent such as octamethylcyclotetrasiloxane, and the like. In particular, hexane, cyclohexane, and n-heptane are suitably used because the solubilities of vinyl-based monomer and water in the solvent are small and they can be removed easily after polymerization.

In the inverse suspension polymerization according to the present invention, a hydrophilic vinyl-based monomer (and a neutralized salt thereof) is preferably dissolved in water to form an aqueous solution and then is added to the polymerization system. The concentration of the hydrophilic vinyl-based monomer in the aqueous solution in which the hydrophilic vinyl-based monomer is dissolved is preferably in the range from 5% to 80% by weight, and particularly from 20% to 60% by weight from the viewpoint that the inverse suspension polymerization proceeds smoothly and the productivity is good.

In the case where the hydrophilic vinyl-based monomer for the inverse suspension polymerization is a vinyl-based monomer having an acidic group such as a carboxyl group and a sulfonic acid group, when the hydrophilic vinyl-based monomer is added to water and the acidic group in the vinyl-based monomer is neutralized with an alkali aqueous solution such as aqueous ammonia, an aqueous sodium hydroxide solution, and an aqueous potassium hydroxide solution, an aqueous solution can be prepared in which the vinyl-based monomer is dissolved sufficiently.

In the producing method of the present invention, a dispersion stabilizer is an essential component.

Specific examples of the dispersion stabilizer include a macromonomer type dispersion stabilizer, and a nonionic surfactant such as a sorbitan fatty acid ester, a polyglycerol fatty acid ester, a sucrose fatty acid ester, sorbitol fatty acid ester and a polyoxyethylene alkyl ether.

Among these, a macromonomer type dispersion stabilizer is preferable. The macromonomer type dispersion stabilizer is a vinyl-based monomer-derived polymer having, at an end thereof, a radically polymerizable unsaturated group.

Moreover, it is preferable to use a relatively high hydrophobic nonionic surfactant having an HLB of 3 to 8, such as sorbitan monooleate and sorbitan monopalmitate, together with a macromonomer type dispersion stabilizer. These surfactants may be used singly or in combination of two or more types thereof.

The preferable macromonomer as the above-mentioned macromonomer type dispersion stabilizer are a macromonomer having an α-substituted vinyl group represented by the following formula (1), at an end of a polymer obtained by radical polymerization of a vinyl-based monomer at a temperature range of 150° C. to 350° C., and/or a macromonomer having a (meth)acryloyl group at an end of a polymer derived from a vinyl-based monomer.

(In the Formula, X is a Monovalent Polar Group.)

These macromonomers are excellent as a dispersion stabilizer and preferable. The weight average molecular weight of the macromonomer is preferably in the range from 1,000 to 30,000. The macromonomer preferably has both structural units derived from a hydrophilic vinyl-based monomer and a hydrophobic vinyl-based monomer. The structural unit derived from the hydrophobic vinyl-based monomer is preferably a structural unit derived from a (meth)acrylic acid alkyl ester having 8 or more carbon atoms, and the structural unit derived from the hydrophilic vinyl-based monomer is preferably a structural unit derived from a vinyl-based monomers having a carboxyl group.

In particular, when the hydrophilic particles are produced by inverse suspension polymerization of a vinyl-based monomer using a macromonomer type dispersion stabilizer, it is preferable to use a multifunctional vinyl-based monomer together with a monofunctional compound. Thereby hydrophilic particles having improved strength and shape retainability can be obtained.

The dispersion stabilizer is preferably added to a polymerization system after being dissolved or uniformly dispersed in a hydrophobic organic solvent that is a dispersion medium (oil phase).

The amount of the dispersion stabilizer to be used is preferably in the range from 0.1 to 50 parts by weight, more preferably from 0.2 to 20 parts by weight, and further preferably from 0.5 to 10 parts by weight based on 100 parts by weight of the total amount of the vinyl-based monomer in order to obtain hydrophilic polymer microparticles uniform in particle size while maintaining excellent dispersion stability. If the amount of the dispersion stabilizer used is too small, the dispersion stabilities of the vinyl-based monomer and formed polymer microparticles in the polymerization system becomes poor, and the formed particles easily aggregate, precipitate, and have variation in particle size. On the other hand, if the amount of the dispersion stabilizer used is too large, the amount of the microparticles (having size of 1 μm or smaller) by-produced may be increased.

In the inverse suspension polymerization according to the present invention, it is preferable to carry out the polymerization so that the weight ratio of an oil phase (dispersion medium) to an aqueous phase (dispersoid) in the polymerization system may become from 99:1 to 20:80, and particularly 95:5 to 30:70, from the viewpoint that productivity, dispersion stability during polymerization, and control of particle size of the polymer microparticles can be satisfied at the same time.

The inverse suspension polymerization according to the present invention is preferably carried out under stirring and the reaction is preferably performed in a reaction vessel equipped with a stirring blade or a baffle. As the stirring blade, an anchor blade and a paddle blade are preferable, and a paddle blade is particularly preferred. Generally, suspension polymerization is influenced by stirring power. If the stirring power is excessively low, polymer microparticles having a desired particle size cannot be obtained or it is impossible to inhibit an aqueous solution of monomers from merging, and, as a result, problems may arise, such as that a perfectly spherical microparticle can not be obtained or that many aggregated particles are formed.

In the present invention, the stirring power per unit volume in the reaction vessel is preferably 0.5 kw/m$^3$ or higher, and particularly 1.0 kw/m$^3$ or higher.

In the inverse polymerization according to the present invention, a redox type initiator including an oil-soluble oxidizing agent and a water-soluble reducing agent is used as a polymerization initiator. A redox reaction makes it possible to proceed a polymerization initiation at a low temperature, increase the concentration of a vinyl-based monomer in a polymerization reaction liquid and increase the polymerization rate. Therefore, the productivity can be improved and the molecular weight of a polymer formed can be higher.

As mentioned above, a hydrophobic organic solvent is used as a continuous phase (oil phase) in which a dispersion stabilizer is dissolved or dispersed in the inverse suspension polymerization. The oil-soluble oxidizing agent means an oxidizing agent which dissolves in such a continuous phase.

The oil-soluble oxidizing agent according to the present invention is preferably a compound having an octanol/water partition coefficient (logPow) provided in Japanese Industrial Standards Z7260-107 or OECD TEST Guideline 107 of preferably −1.4 or more, more preferably 0.0 or more, and further preferably 1.0 or more.

Specific example thereof includes an organic peroxide such as tert-butyl hydroperoxide (logPow=1.3), di-tert-butyl hydroperoxide, tert-hexyl hydroperoxide, di-tert-amyl hydroperoxide, cumene hydroperoxide (logPow=2.2), dicumyl peroxide (logPow=5.5), tert-butyl cumyl peroxide, tert-butyl peroxy pivalate, benzoyl peroxide (logPow=3.5), and lauroyl peroxide. Among these, tert-butyl hydroperoxide and cumene hydroperoxide are preferable. The particular preferred is cumene hydroperoxide.

Reducing agents known as a reducing agent to be used as a redox type polymerization initiator can be used as the water-soluble reducing agent. Among these, sodium sulfite, sodium hydrogensulfite, and sodium hydrosulfite are preferable. Particularly preferred is sodium hydrosulfite. Since the water-soluble reducing agent as such is deactivated gradually through their contact with air, it is preferable to dissolve the agent in water several minutes before a desired time of starting polymerization and then add it.

It is necessary for the oil-soluble oxidizing agent and the water-soluble reducing agent that the water-soluble reducing agent should be fed to a reactor first and then the oil-soluble oxidizing agent should be fed to the reactor. It is preferable that after the water-soluble reducing agent is water-solubilized to charge into the reactor, the oil-soluble oxidizing agent is fed within 0.5 to 15 minutes and preferably within 1 to 5 minutes to perform the polymerization.

The whole amount of the oil-soluble oxidizing agent is fed to the reactor over a time of preferably 20 to 120 seconds, and particularly 20 to 60 seconds.

It is undesirable that the feed time of the oil-soluble oxidizing agent is shorter than 20 seconds because, if so, diffusion of the oxidizing agent may fail to catch up with the feed of the oxidizing agent and cause local generation of radicals, which may easily result in troubles such as generation of aggregates. On the other hand, if it is longer than 120 seconds, the oxidizing agent may be partially remained unreacted in the system due to consumption of the reducing agent caused by the decomposition thereof occurring in another mechanism. It is undesirable that the oxidizing agent remains unreacted because, this may cause of troubles, such as generation of aggregates during the following azeotropic dehydration step, the drying step, and the like.

There is no particular limitation on the feed time of a water-soluble reducing agent, and it is preferable to feed it within 15 minutes because the reducing agent is generally easily decomposed due to their contact with the air or the like.

The oil-soluble oxidizing agent is preferably fed to a reactor through a feed port located below the reaction liquid level. Generally, a feed port for a polymerization catalyst is provided at an upper portion of a reactor and a polymerization catalyst is fed at one time or continuously through this port to the reaction liquid level. In the present invention, a method of feeding a polymerization catalyst into a reaction liquid through a pipe connected to a side wall of a reactor is preferable from the viewpoint of uniform diffusion of the catalyst.

There is no particular limitation on the position of the feed port so long as the port is located at a position which is always immersed in a reaction liquid. The feed port is preferably located at a position within ±1 m in terms of the vertical height from the upper end or the lower end of a stirring blade, and is more preferably located at a position within ±50 cm.

Examples of the method for feeding the oil-soluble oxidizing agent include a method for feeding it through a pipe leading to a feed port located in a portion below the reaction liquid level, by using a pump or gas pressure of an inert gas such as nitrogen.

The amount of the polymerization initiator to be used may be adjusted according to the types of the vinyl-based monomer and the particle size and molecular weight of the resultant polymer microparticles. The amount of the oil-soluble oxidizing agent is in the range from 0.001 to 0.15 mol, and particularly from 0.003 to 0.07 mol based on 100 mol of the total of the vinyl-based monomer.

Additionally, the ratio of the oil-soluble oxidizing agent and the water-soluble reducing agent is not particularly limited. The molar ratio of the oil-soluble oxidizing agent to the water-soluble reducing agent is preferably 1.0 to 0.25-15.0, and particularly 1.0 to 1.0-10.0.

If the ratio is outside that range, the unfavorable may be occurred. Example thereof includes a generation of aggregates caused by lowering of the reaction rate of monomers, shortening of the chain of a polymer constituting particle, remaining of a catalyst after the completion of polymerization; and the like.

In the inverse suspension polymerization according to the present invention, the temperature of the reaction liquid at the time of starting the polymerization is preferably in the range from 0° C. to 40° C., more preferably from 5° C. to 30° C., and particularly from 10° C. to 25° C. If the reaction start temperature is lower than 0° C., freezing of a polymerization facility or a reaction solution becomes a problem and a large cost is required for cooling. On the other hand, if the reaction start temperature exceeds 40° C., it is necessary, from a safety aspect, to reduce the amount of monomers to be fed, resulting in a large production cost.

In the production method of the present invention, the average particle size of the resultant polymer microparticles is preferably in the range from 2 to 150 μm, more preferably from 2 to 100 μm, and further preferably from 5 to 70 μm. If the average particle size is smaller than 2 μm, the slipping property or blocking preventing function may be insufficient. If it exceeds 150 μm, an problem such as unfavorable appearance, deterioration of touch feeling and lowering of the strength after incorporating materials may be occurred. When the size of the polymer microparticles becomes smaller, the stabilizing effect of the dispersion stabilizer comes to be needed more because the interfacial area between a continuous phase and a dispersed phase becomes larger.

As to the size of the polymer microparticles, the size under a condition where the particles are used becomes important. When the polymer microparticles are used as water-swollen particles, it is preferable that the size when the particles are swollen with water be within the above-mentioned range.

The polymer microparticles are preferably crosslinked. As mentioned above, the crosslinking structure of a polymer constituting the microparticles is based on copolymerization of a multifunctional vinyl-based monomer.

It is also possible to adjust the degree of crosslinking by reacting a crosslinking agent after polymerizing a vinyl-based monomer having a functional group by inverse suspension polymerization. For example, there is a method in which polymer microparticle obtained using a monomer having a carboxyl group are subjected to crosslinking with ethylene glycol diglycidyl ether.

Alternatively, a polymer can be crosslinked by a known method such as ionic bond type crosslinking via a multivalent metal ion and covalent bond type crosslinking in which crosslinking is achieved by application of radiation.

When the polymer microparticles according to the above-mentioned crosslinking method are having a crosslink density of 0.5% or more by mol, the particle can exert its characteristics in various applications mentioned above. Therefore, it is preferable that the polymer microparticles have a crosslink density of 0.5% or more by mol.

After forming a dispersion liquid of polymer microparticles by inverse suspension polymerization according to the present invention, a dry powder of the polymer microparticles can be obtained using a known method. A method of obtaining a dry powder by heating the dispersion liquid as it is and then removing volatile components under a reduced pressure reduction, and a method comprising removing a dispersion stabilizer, unreacted monomers and the like by performing solid-liquid separation by filtration or centrifugal separation, and washing, and then performing drying, are selected. To perform a washing step is desirable because the primary dispersion property of the microparticles after drying increases.

Additionally, it is desirable to remove water before drying by azeotropic distillation or the like since the dispersed phase contains water. When the water is removed beforehand, it is possible to prevent particles from fusing at the time of drying and, as a result, the primary dispersion property of the particles after drying increases.

According to the present invention, it is possible to smoothly produce polymer particles having an average particle size in a saturated water-swollen state of 2 to 100 μm and a content ratio of particles having a particle size of 150 μm or larger in a saturated water-swollen state of 1.0% or less by weight. Such polymer particles can demonstrate its characteristics remarkably in various applications.

Furthermore, it is also possible to produce polymer particles having a water absorption ratio of 5 to 50 times, an average particle size in a saturated water-swollen state of 2 to 100 μm, and a content ratio of particles having a particle size of 150 μm or larger in a saturated water-swollen state of 0.3% or less by weight. The polymer will become polymer particles that lead to excellent characteristics in various applications.

It is noted that the water absorption ratio of the polymer microparticles, the average particle size in a state where the particles are saturated and swollen with water, and the content of a particle saturated and swollen with water having a particle size of 150 μm or larger in the present specification are values measured or determined by the methods described in the following Example section.

EXAMPLES

Hereinafter, the present invention is described in detail using Examples. In the following description, "part" means part by weight and "%" means % by weight.

Production Example 1

Production of Macromonomer Compositions UM-1 and UM-1HP

The temperature of an oil jacket of a 1,000-mL pressuring stirring vessel type reactor with the oil jacket was kept at 240° C.

A monomer mixture liquid prepared in proportions of 75.0 parts of lauryl methacrylate (hereinafter referred to as "LMA") and 25.0 parts of acrylic acid (hereinafter referred to as "AA") as a monomer, 10.0 parts of methyl ethyl ketone (hereinafter referred to as "MEK") as a polymerization solvent, and 0.45 part of di-tert-butyl peroxide (hereinafter referred to as "DTBP") as a polymerization initiator was charged into a tank for starting material.

Feed of the monomer mixture liquid in the tank for starting material to a reactor was started, and the feed of the monomer mixture liquid and extraction of a reaction mixture liquid were carried out so that the weight of the contents within the reactor would be 580 g and the average residence time would be 12 minutes. The temperature in the reactor and the pressure in the reactor were adjusted to 235° C. and 1.1 MPa, respectively. The reaction mixture liquid extracted from the reactor was depressurized to 20 kPa and continuously fed to a thin-film evaporator maintained at 250° C. Thereby a macromonomer composition from which a monomer, a solvent and the like was distilled was discharged. The monomer, the solvent and the like that were distilled were cooled with a condenser and collected as a distillate.

A time when 60 minutes had elapsed from a time when the temperature in the reactor had become stable at 235° C. after the start of the feed of the monomer mixture liquid was defined as a collection starting point, from which the reaction was continued for 48 minutes and then a macromonomer composition UM-1 was collected. During this period, 2.34 kg of the monomer mixture liquid was fed to the reactor, and 1.92 kg of the macromonomer composition was collected from the thin-film evaporator. Moreover, 0.39 kg of the distillate was collected in a distillation tank.

The distillate was analyzed by gas chromatography, and it was found that 100 parts by weight of the distillate contained 31.1 parts of LMA, 16.4 parts of AA, and 52.5 parts of the solvent and others.

From the amount and the composition of the monomer mixture liquid fed, the amount of the macromonomer composition collected, and the amount and the composition of distillate collected, the reaction rate of the monomer was calculated to be 90.2%, and the constitutional monomer composition ratio of the macromonomer composition UM-1 was calculated to be LMA to AA=76.0 to 24.0 (weight ratio).

The molecular weight of the macromonomer composition UM-1 was measured by gel permeation Chromatography (hereinafter referred to as "GPC") using tetrahydrofuran as an eluate and the polystyrene-equivalent weight average molecular weight (hereinafter referred to as "Mw") and the polystyrene-equivalent number average molecular weight (hereinafter referred to as "Mn") were 3,800 and 1,800, respectively. Additionally, the concentration of terminal ethylenically unsaturated bond in the macromonomer composition was determined through $^1$H-NMR measurement of the macromonomer composition. From the concentration of terminal ethylenically unsaturated bond obtained by $^1$H-NMR measurement, Mn obtained by GPC, and the constitutional monomer ratio, the introduction ratio of the terminal ethylenically unsaturated bond (hereinafter referred to as "F value") of the macromonomer composition UM-1 was calculated to be 97%.

The produced macromonomer composition UM-1 was dissolved by heating in an appropriate amount of n-heptane, and then n-heptane was added so that the solid concentration would become 30.0%±0.5%. Thus, n-heptane solution UM-1HP containing the macromonomer composition UM-1 was produced. The solid concentration was measured from a heat-calculated fraction after heating at 150° C. for one hour.

As to starting materials including a monomer, a polymerization solvent, a polymerization initiator and the like, commercially available industrial products were used as received without performing any treatment, such as purification.

Example 1

Production of Polymer Microparticles T-1

For a polymerization reaction was used a reactor having a capacity of 250 liters, equipped with a stirring mechanism consisting of a pitched paddle stirring blade and two vertical baffles and further equipped with a thermometer, a reflux condenser, and a nitrogen introduction tube. The nitrogen introduction tube is separated into two branches at the outside of the reactor and has a configuration capable of feeding nitrogen through one branch and a polymerization catalyst through the other by using a pump. The nitrogen introduction tube is connected to a wall of the reactor at an almost the same height as the upper end of the stirring blade. Charging was conducted so that the whole volume of the reaction liquid would become 220 liters. The details are as follows.

A reactor was charged with 4.7 parts (1.4 parts in terms of pure content of UM-1) of the UM-1HP produced in Production Example 1 and 2.0 parts of sorbitan monooleate ("REODOL AO-10" manufactured by KAO Corp.) as a dispersion stabilizer and 400.3 parts of n-heptane as a polymerization solvent, which were stirred and mixed while the solution was kept at a temperature of 40° C., so that an oil phase was prepared. The oil phase was stirred at 40° C. for 30 minutes and then was cooled to 20° C.

On the other hand, into another container were charged 100.0 parts of AA, 13.0 parts (equivalent to 2.2 mol % relative to a monofunctional monomer) of polyethylene glycol diacrylate ("ARONIX M-243" manufactured by TOAGOSEI CO., LTD., average molecular weight 425), and 95.0 parts of ion exchange water, which were stirred to be dissolved uniformly. Furthermore, while the mixed liquid was cooled so that the temperature thereof would be kept at 40° C. or lower, 70.8 parts of a 25% aqueous ammonia solution was added slowly to neutralize the mixed liquid. Thus, a monomer mixed liquid was obtained.

After setting the stirring revolution speed to be 130 rpm, the obtained monomer mixed liquid was charged into the reactor, so that a dispersion liquid was prepared in which the monomer mixed liquid was dispersed in the oil phase. During this operation, the stirring power was measured to be 1.36 kW/m$^3$. The temperature in the reactor was kept at 20° C. and nitrogen was blown into the dispersion liquid to remove oxygen in the reactor. At a time when 1 hour and 40 minutes had passed since the charging of the monomer mixture, an aqueous solution of 0.045 part of sodium (Na) hydrosulfite and 0.72 part of ion exchange water was added through an addition port mounted at the upper portion of the reactor. Three minutes later, a solution prepared by diluting 0.039 part of "Percumyl H80" manufactured by NOF Corp. (a 80% solution of cumene hydroperoxide) with 3.1 parts of n-heptane was fed with a pump through the nitrogen introduction tube. The feed was performed in 30 seconds. The temperature in the reactor increased immediately after the start of the feed, and this confirmed that polymerization was initiated. The increased internal temperature reached the peak in about two minutes, and the temperature was 66.0° C. Then, the reaction liquid was cooled to room temperature to obtain an in-oil dispersion liquid of polymer microparticles T-1.

When the in-oil dispersion liquid of T-1 was discharged from the reactor, the dispersion liquid was filtered using a filter having a mesh opening of 75 μm. Filterability was good and no appreciable attachment was found on the filter after the filtration. When the attachment of a resin to the inner wall surface of the reactor was checked after the discharge, the resin was slightly found at the vicinity of the reaction liquid level during the polymerization and it was confirmed that the polymer microparticles T-1 could be produced stably.

When a part of the in-oil dispersion liquid of T-1 was sampled and was observed with a digital microscope ("KH-3000" manufactured by HIROX Co., Ltd.) at a magnification of 420, spherical microparticles having a distribution centering approximately 10 to 20 μm were observed. The photograph thereof is shown in FIG. 1. No aggregated particles composed of particles united together were observed.

Figure 2:
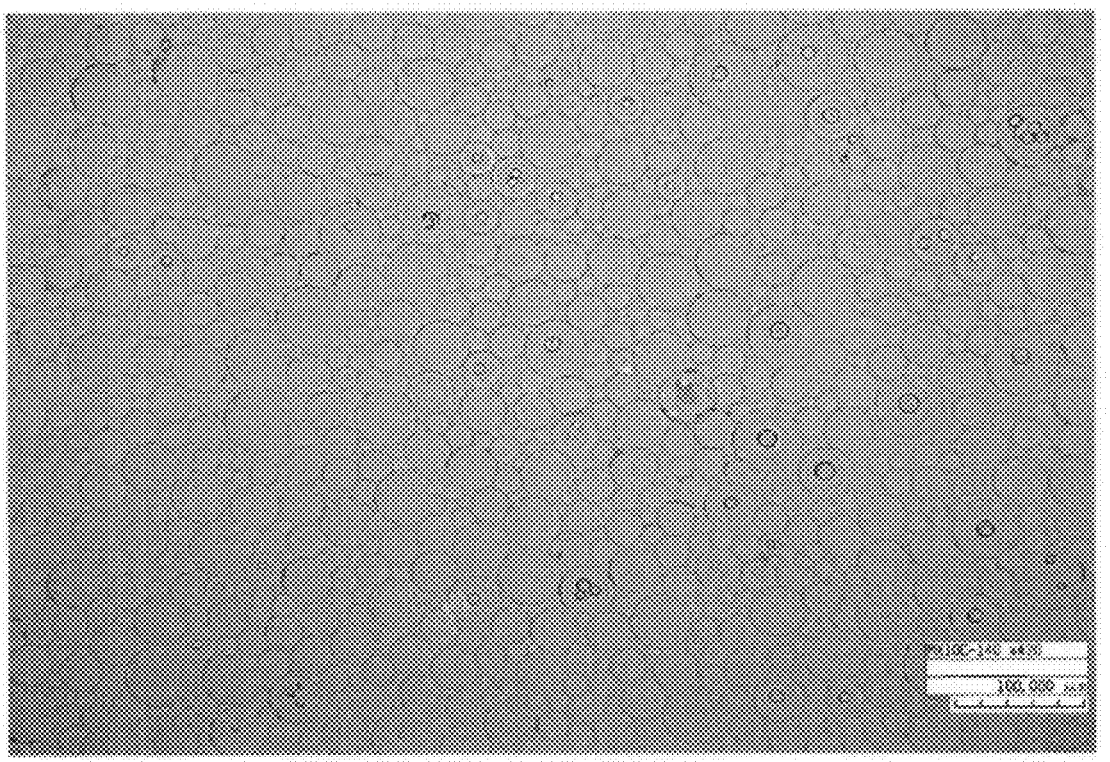
FIG. 2 is a microscope photograph of polymer microparticles T-1 (after polymerization, in-water dispersion)

For a sample prepared by drying the in-oil dispersion liquid at 110° C. for one hour, the water absorption ratio (see the polymer microparticles analysis condition (2) below) was measured to be 20.4. When the dried sample was dispersed in an excessive amount of ion exchange water to be saturated and swollen and was observed at a magnification of 420, spherical microparticles having a distribution centering approximately 30 to 40 μm were observed. The photograph thereof is shown in FIG. 2.

For the water-saturated-swollen particles T-1, particle size distribution measurement (see the polymer microparticles analysis condition (3) below) was performed using a laser diffraction scattering type particle size distribution analyzer. The obtained particle size distribution had a single peak, and the water-saturated-swollen particle size was 38.9 μm. It was confirmed that the polymer microparticles T-1 had a water absorption capacity, kept spherical shape also when it was swollen due to water absorption, and was primarily dispersed in water. Moreover, for a sample prepared by heating the T-1 in an oil bath, thereby azeotropically distilling water and heptane contained in the particle to remove water to a dehydration degree of 95%, followed by removal of the solvent and powdering, the amount of a wet sieve residue (see the polymer microparticles analysis condition (4) below) was measured to be 0.004%. The polymer microparticles T-1 were confirmed to contain no coarse particles greater than 150 μm also when they were saturated and swollen with water after the azeotropic dehydration.

In Table 1, "Condition of attachment to wall" is a result of visual observation of a resin attachment to the inner wall surface of the reactor after the completion of the reaction; "○" indicates that there was almost no attachment, "Δ" indicates that there was attachment at a part corresponding to the reaction liquid level, and "X" indicates that there was remarkable attachment on the whole wall.

"Polymerization slurry filterability" is a result of observation of the filterability performed when a resulting dispersion liquid was filtered with a filter having a mesh opening of 75 μm; "○" indicates that clogging of the filter did not occur, "Δ" indicates that clogging occurred once or twice, and "X" indicates that filtration at 75 μm failed.

"Appearance of wet sieve residue after azeotropic dehydration" is a result obtained by observing the wet sieve residue of a powdered sample prepared by dehydration, and aggregates means that there was an aggregate composed of aggregated particles.

Example 2

Production of Polymer Microparticles T-2

Production was conducted in the same manner as that in Example 1, except for setting the feeding time of the oil-soluble oxidizing agent "Percumyl H80" to 10 seconds. The results are shown in Table 1.

Example 3

Production of Polymer Microparticles T-3

Production was conducted in the same manner as that in Example 1, except for setting the feeding time of the oil-soluble oxidizing agent "Percumyl H80" to 120 seconds. The results are shown in Table 1.

Example 4

Production of Polymer Microparticles T-4

Production was conducted in the same manner as that in Example 1, except for setting the feeding time of the oil-soluble oxidizing agent "Percumyl H80" to 180 seconds. The results are shown in Table 1.

Example 5

Production of Polymer Microparticles T-5

Production was conducted in the same manner as that in Example 1, except that an aqueous solution of sodium hydrosulfite was added through the addition port mounted at the upper portion of the reactor at a time when 1 hour and 40 minutes have passed since the charge of a monomer mixture, and that three minutes later a n-heptane solution containing "Percumyl H80" was fed in 30 seconds using a pump through another port mounted at the upper portion of the reactor. The results are shown in Table 1.

Example 6

Production of Polymer Microparticles T-6

Production was conducted in the same manner as that in Example 1, except that 3.4 parts of sorbitan monooleate was used instead of 4.7 parts of UM-1HP (pure content 1.4 parts) and 2.0 parts of sorbitan monooleate, and that 403.6 parts of n-heptane was used as a polymerization solvent. The results are shown in Table 1.

Example 7

Production of Polymer Microparticles T-7

Production was conducted in the same manner as that in Example 1, except for using "Perbutyl H69" (PBH) manufactured by NOF Corp. which was a 69% solution of tert-butyl hydroperoxide as an oil-soluble oxidizing agent instead of "Percumyl H80". The results are shown in Table 1.

Comparative Example 1

Production of Polymer Microparticles T-8

Into a 500-ml beaker were charged 100.0 g of Acrylic acid, 13.0 gs (equivalent to 2.2 mol % relative to a monofunctional monomer) of polyethylene glycol diacrylate ("ARONIX M-243" manufactured by TOAGOSEI CO., LTD., average molecular weight 425), and 95.0 g of ion exchange water, which were stirred to be dissolved uniformly. Furthermore, while the mixed liquid was cooled so that the temperature thereof would be kept at 40° C. or lower, 70.8 g of a 25% aqueous ammonia solution was added slowly to neutralize the mixed liquid. Thus, a monomer mixed liquid was obtained. Furthermore, an aqueous solution of 0.33 g of ammonium persulfate salt and 4.9 g of ion exchange water was added to the monomer mixed liquid and mixed uniformly.

Subsequently, 5 g of fatty acid ester of sucrose (equivalent mixture of "S-570" and "S-770" manufactured by Mitsubishi-Kagaku Foods Corp.) and 490.2 g of cyclohexane were charged into a 2-liter beaker and the fatty acid ester of sucrose was dissolved by heating under stirring. Then this solution was added to a flask with a capacity of 2 liters equipped with a stirring mechanism consisting of a pitched paddle stirring blade and two vertical baffles. The above-mentioned aqueous solution of monomer was added to this and was stirred at 600 rpm for one hour. Thus, the water-in-oil type dispersion liquid was prepared (reaction liquid A).

On the other hand, another reactor having a capacity of 2 liters was prepared which has a stirring mechanism consisting of a pitched paddle stirring blade and two vertical baffles, and further a thermometer, a reflux condenser, and a nitrogen introduction tube. 5 g of fatty acid ester of sucrose and 490.2 g of cyclohexane were added thereto. The fatty acid ester of sucrose (equivalent mixture of "S-570" and "S-770" manufactured by Mitsubishi-Kagaku Foods Corp.) was dissolved by heating to a temperature of 80° C. under stirring, and the solution temperature was kept at 80° C. while the internal atmosphere was replaced with nitrogen (reaction liquid B).

While stirring both the reaction liquid A and the reaction liquid B at a revolution of 600 rpm, the reaction liquid A was dropped to the reaction liquid B, thereby performing polymerization. The whole amount of the reaction liquid A was planned to be dropped in one hour, but attachment of a resin to the baffles and the inner wall of the reactor came to be observed since the time when about 20 minutes had passed since the start of the dropping, and the growth of the attached gel with lapse of time was observed.

After the completion of dropping the aqueous solution of monomer, heating and stirring were continued for 60 minutes. When the resulting in-oil dispersion liquid T-6 was discharged from the reactor, filtration was tried using a filter having a mesh opening of 75 μm, but clogging occurred immediately and the liquid was not able to be filtered. When the in-oil dispersion liquid T-6 was taken out and observed, it was found that most part thereof was a huge aggregated mass and desired microparticles were not obtained.

Comparative Example 2

Production of Polymer Microparticles T-9

Production was conducted in the same manner as that in Example 1, except that a n-heptane solution of "Percumyl H80" was added from a hopper at a time when 1 hour and 40 minutes have passed since the charge of a monomer mixture, and that three minutes later an aqueous solution of sodium hydrosulfite was fed in 30 seconds using a pump through a nitrogen introduction tube.

The temperature of the contents in the reactor was increased immediately after the time when the feed of the aqueous solution of sodium hydrosulfite was started and the temperature of the reaction liquid was reached 40° C. in about two minutes. At that time, large gel blocks were found visually on the reaction liquid level. The results were shown in Table 1.

TABLE 1

|  | Example 1 | Example 2 | Example 3 | Example 4 |
|---|---|---|---|---|
| Polymer microparticles | T-1 | T-2 | T-3 | T-4 |
| Crosslink density (mol %) | 2.2 | 2.2 | 2.2 | 2.2 |
| Sorbitan monooleate | 2.0 | 2.0 | 2.0 | 2.0 |
| UM-1HP (pure content) | 1.3 | 1.3 | 1.3 | 1.3 |
| Fatty acid ester of sucrose | — | — | — | — |
| Order of catalyst addition | Reducing agent (Hopper/at one time) ↓ | Reducing agent (Hopper/at one time) ↓ | Reducing agent (Hopper/at one time) ↓ | Reducing agent (Hopper/at one time) ↓ |
| (Feed port/Feed time) | Oxidizing agent (Side wall/30 sec) | Oxidizing agent (Side wall/10 sec) | Oxidizing agent (Side wall/120 sec) | Oxidizing agent (Side wall/180 sec) |
| Condition of attachment on wall | ○ | ○ | ○ | ○ |
| Filterability of polymerization slurry | ○ | Δ | ○ | ○ |
| Swollen particle diameter (μm) | 38.9 | 39.2 | 40.3 | 41.2 |
| Water absorption ratio (times) | 20.4 | 20.1 | 23.1 | 21.5 |
| Wet sieve residue (%, after dehydration) | 0.004 | 0.087 | 0.055 | 0.329 |

|  | Example 5 | Example 6 | Example 7 | Comparative Example 1 | Comparative Example 2 |
|---|---|---|---|---|---|
| Polymer microparticles | T-5 | T-6 | T-7 | T-8 | T-9 |
| Crosslink density (mol %) | 2.2 | 2.2 | 2.2 | 2.2 | 2.2 |
| Sorbitan monooleate | 2.0 | 3.4 | 2.0 | — | 2.0 |

TABLE 1-continued

| | | | | | |
|---|---|---|---|---|---|
| UM-1HP (pure content) | 1.3 | 0.0 | 1.3 | — | 1.3 |
| Fatty acid ester of sucrose | — | — | — | 5.0 | — |
| Order of catalyst addition (Feed port/Feed time) | Reducing agent (Hopper/at one time) ↓ Oxidizing agent (Top/30 sec) | Reducing agent (Hopper/at one time) ↓ Oxidizing agent (Side wall/30 sec) | Reducing agent (Hopper/at one time) ↓ Oxidizing agent (PBH) (Side wall/30 sec) | — | Oxidizing agent (Hopper/at one time) ↓ Reducing agent (Side wall/30 sec) |
| Condition of attachment on wall | ○ | Δ | ○ | X | X |
| Filterability of polymerization slurry | ○ | Δ | ○ | X | X |
| Swollen particle diameter (μm) | 40.5 | 40.2 | 39.7 | — | 46.9 |
| Water absorption ratio (times) | 22.1 | 20.3 | 20.8 | — | 25.1 |
| Wet sieve residue (%, after dehydration) | 0.008 | 0.097 | 0.039 | — | 0.468 |

Referential Test: Check of Aptitude for Increasing Scale

The results of tests performed in Examples and Comparative Examples using a 250-liter reactor (a 2-liter reactor for T-8 only) are provided. Moreover, the results of tests performed by changing the production scale under the conditions of Examples 1 to 7 and Comparative Examples 1 to 2 are provided in the following Table 2. The evaluation conditions given in Table 2 are the same as those of Table 1 above.

TABLE 2

| | | Example 1 | Example 2 | Example 3 | Example 4 | Example 5 |
|---|---|---|---|---|---|---|
| | Polymer microparticles | T-1 | T-2 | T-3 | T-4 | T-5 |
| | Crosslink density (mol %) | 2.2 | 2.2 | 2.2 | 2.2 | 2.2 |
| 2 L | Condition of attachment on wall | ○ | ○ | ○ | ○ | ○ |
| | Filterability of polymerization slurry | ○ | ○ | ○ | ○ | ○ |
| | Wet sieve residue (%, after dehydration) | 0.002 | 0.018 | 0.022 | 0.120 | 0.002 |
| 250 L | Condition of attachment on wall | ○ | ○ | ○ | ○ | ○ |
| | Filterability of polymerization slurry | ○ | Δ | ○ | ○ | ○ |
| | Wet sieve residue (%, after dehydration) | 0.004 | 0.087 | 0.055 | 0.329 | 0.008 |
| 5 m³ | Condition of attachment on wall | ○ | Δ | ○ | ○ | ○ |
| | Filterability of polymerization slurry | ○ | Δ | ○ | ○ | ○ |
| | Wet sieve residue (%, after dehydration) | 0.004 | 0.375 | 0.090 | 1.76 | 0.071 |

| | | Example 6 | Example 7 | Comparative Example 1 | Comparative Example 2 |
|---|---|---|---|---|---|
| | Polymer microparticles | T-6 | T-7 | T-8 | T-9 |
| | Crosslink density (mol %) | 2.2 | 2.2 | 2.2 | 2.2 |
| 2 L | Condition of attachment on wall | ○ | ○ | X | ○ |
| | Filterability of polymerization slurry | ○ | ○ | X | ○ |
| | Wet sieve residue (%, after dehydration) | 0.034 | 0.031 | Unmeasurable | 0.065 |
| 250 L | Condition of attachment on wall | Δ | ○ | Unperformable | X |
| | Filterability of polymerization slurry | Δ | ○ | | X |
| | Wet sieve residue (%, after dehydration) | 0.097 | 0.039 | | 0.468 |

TABLE 2-continued

| 5 m³ | Condition of attachment on wall | Δ | ◯ | Unperformable | Unperformable |
|---|---|---|---|---|---|
| | Filterability of polymerization slurry | Δ | ◯ | | |
| | Wet sieve residue (%, after dehydration) | 0.217 | 0.153 | | |

The polymer microparticles analysis conditions (1) to (4) used in Examples are as follows.

(1) Solid Concentration

The weight (a) of about 1 g of a sample was measured, the weight (b) of a residue after drying in a windless oven at a temperature of 150° C. for 60 minutes was measured, and then the solid concentration was calculated by the following equation. For the measurement a weighing bottle was used. Other operations were performed in accordance with JIS K0067-1992 (Test methods for loss and residue of chemical products).

$$\text{Solid concentration}(\%) = (b/a) \times 100$$

(2) Water Absorption Ratio

The water absorption ratio was measured according to the following method. The measuring device is illustrated in FIG. 3.

Figure 3:
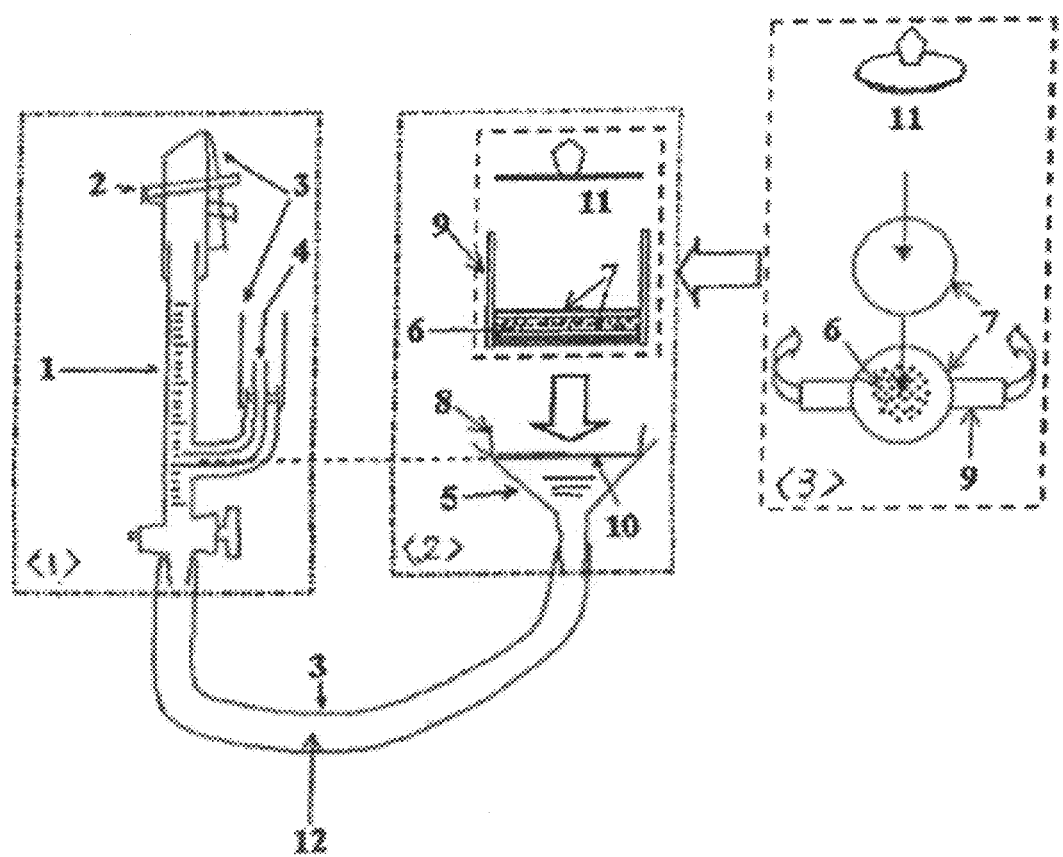
FIG. 3 is a diagram showing an apparatus for the measurement of the water absorption ratio of polymer microparticles.

The measuring device is composed of <1> to <3> shown in FIG. 3.

<1> is consisting of a burette 1 having a branch pipe for air ventilation, a pinch cock 2, a silicone tube 3, and a polytetrafluoroethylene tube 4.

In <2>, a supporting cylinder 8 having many holes in its bottom is mounted on a funnel 5, and a filter paper 10 for device is mounted thereon.

In <3>, a sample 6 of the polymer microparticles is inserted into two filter papers 7 for fixing sample, and the filter papers for fixing sample are fixed with an adhesive tape 9. All the filter papers to be used are "ADVANTEC No. 2" having an inner diameter of 55 mm.

<1> and <2> are linked with the silicone tube 3.

The levels with respect to the burette 1 of the funnel 5 and the supporting cylinder 8 are fixed, and the lower end of the polytetrafluoroethylene tube 4 disposed within the burette branch pipe and the bottom of the supporting cylinder 8 are set to be at the same level (dotted line in FIG. 3).

The measuring method is described below.

The pinch cock 2 in <1> was released, and ion exchange water was charged from the top of the burette 1 through the silicone tube 3 so that the space from the burette 1 to the filter paper 10 for device was filled with ion exchange water 12. Subsequently, the pinch cock 2 was closed and air was removed through the polytetrafluoroethylene tube 4 connected to the burette branch pipe with a rubber stopper. Thus, a condition was obtained such that ion exchange water 12 was continuously fed from the burette 1 to the filter paper 10 for device.

After that, excess ion exchange water 12 which oozed from the filter paper 10 for device was removed, and then a read graduation (a) of the burette 1 was recorded.

A dry powder was sampled in an amount of 0.1 to 0.2 g, and then the powder was placed uniformly on the center of the filter paper 7 for fixing sample as illustrated in <3>. Another filter paper was used to sandwich the sample and the two filter papers were adhered with an adhesive tape 9 to fix the sample. The filter papers between which the sample was fixed were put on the filter paper 10 for device as illustrated in <2>.

Subsequently, a read graduation (b) of the burette 1 after a lapse of 30 minutes from a time when a lid 11 was put on the filter paper 10 for device was recorded.

The total (c) of the water absorption of the sample and the water absorption of the two filter papers 7 for fixing sample was calculated by (a-b). By the same operation, the water absorption (d) of only the two filter papers 7 containing no water-absorptive polymer sample was measured.

The above-mentioned operations were performed and a water absorption ratio was calculated from the following equation. As to the solid concentration to be used for the calculation, a value measured by the method (1) was used.

Water absorption ratio (times) = $(c-d)/\{\text{Weight of sample (g)} \times (\text{Solid concentration (\%)}/100)\} + 100/(\text{Solid concentration (\%)})$ (3) Water-Swollen Particle Size To 0.02 g of a sample for measurement was added 20 ml of ion exchange water, followed by shaking well. Thus, the sample was dispersed uniformly. For a dispersion liquid resulting from dispersion continued for 30 minutes or more in order to bring the polymer microparticles into a water-saturated-swollen state, the particle size distribution was measured after one-minute application of ultrasonic wave by using a laser diffraction scattering type particle size distribution analyzer ("MT-3000" manufactured by NIKKISO CO., LTD.). Ion exchange water was used as a circulated dispersion medium used in the measurement and the refractive index of the dispersion was adjusted to 1.53. The median diameter (μm) was calculated from the particle size distribution on volume basis obtained by the measurement, and it was defined as a water-swollen particle size.

(4) Measurement of Amount of Particle Having Water-Swollen Particle Size of 150 μm or Larger (a Wet Sieving Residue Method)

Measurement was performed in accordance with JIS K 0069-1992 (test method for sieving of chemical products).

A sample in an amount corresponding to 50 g in terms of solid concentration was weighed and ethanol was added thereto in the same amount as the sample to loosen well. Then the liquid was poured slowly into 3.0 liters of ion exchange water under stirring and stirred for 30 minutes to prepare a water-swollen dispersion liquid of the sample. After confirmation of the uniform dispersion, the dispersion liquid was poured onto a sieve having a diameter of 70 mm and a mesh opening of 150 μm and allowed to pass therethrough. The residue on the sieve was washed with a sufficient amount of water while taking care that the residue does not spill off. Subsequently, the sieve after measurement was dried in a circulation dryer at a temperature of 150° C. for 30 minutes and cooled in a desiccator, and then the weight of the sieve after drying (the total weight of the sieve and the residue) was measured.

The wet sieve residue (%) calculated by the following formula was defined as the amount of particle having a water-swollen particle size of 150 μm or larger. Operations other than those described above were performed in accordance with JIS K 0069-1992 (test method for sieving of chemical products).

Wet sieve residue(%)=[(Weight of sieve after test−
Weight of sieve)/{(Weight of sample used×(Solid concentration/100))}]×100

The results described above showed that no resin attachment to the inner wall of the reactor caused by a polymerization reaction occurred and the filterability of the polymerization slurries was good in the production method of the present invention. Therefore, it was found that a particle uniform in particle size could be produced in a good productivity without the occurrence of particle aggregation. On the other hand, it was found that in Comparative Examples 1 and 2, which are conventional technologies, the productivity was poor, and particularly on a practical production scale it was impossible to produce a particle uniform in particle size.

INDUSTRIAL APPLICABILITY

According to the production method of the present invention, high-quality spherical hydrophilic polymer microparticles remarkably higher uniform in particle size than those by conventional technologies can be produced at high productivity while keeping high dispersion stability and polymerization stability without causing aggregation, clumping and adhesion to a polymerization apparatus of particles during or after polymerization. Moreover, according to the production method of the present invention, even if a particle having a high degree of crosslinking is produced using a large amount of a multifunctional vinyl-based monomer, high-quality hydrophilic crosslinked polymer microparticles uniform in particle size can be produced without causing aggregation, clumping and adhesion to a polymerization apparatus of particles.

What is claimed is:

1. A method for producing polymer microparticles by inverse suspension polymerization of a vinyl-based monomer, wherein an oil-soluble oxidizing agent and a water-soluble reducing agent are used as a polymerization initiator, and wherein said oil-soluble oxidizing agent is fed after said water-soluble reducing agent is fed.

2. The method for producing polymer microparticles according to claim 1, wherein all of said oil-soluble oxidizing agent is fed over a time range from 20 seconds to 120 seconds.

3. The method for producing polymer microparticles according to claim 1, wherein said oil-soluble oxidizing agent is fed to a reactor through a feed port located below the reaction liquid level.

4. The method for producing polymer microparticles according to claim 1, wherein a macromonomer having a radically polymerizable unsaturated group at an end of a polymer derived from a vinyl-based monomer is used as a dispersion stabilizer.

5. The method for producing polymer microparticles according to claim 1, wherein said polymer microparticles produced by inverse suspension polymerization are polymer microparticles having a crosslink density of 0.5% or more by mol.

6. The method for producing polymer microparticles according to claim 1, wherein said polymer microparticles produced by inverse suspension polymerization are polymer microparticles which have an average particle size in a saturated water-swollen state of 2 to 100 μm, and a content ratio of particles having a particle size of 150 μm or larger in a saturated water-swollen state of 1.0% or less by weight.

7. The method for producing polymer microparticles according to claim 1, wherein said polymer microparticles produced by inverse suspension polymerization are polymer microparticles which have a water absorption ratio of 5 to 50 times, an average particle size in a saturated water-swollen state of 5 to 70 μm, and a content ratio of particles having a particle size of 150 μm or larger in a saturated water-swollen state of 0.3% or less by weight.

* * * * *